J. T. ODELL.
COTTON CHOPPER.
APPLICATION FILED AUG. 22, 1919.
1,418,159.
Patented May 30, 1922.
2 SHEETS—SHEET 2.
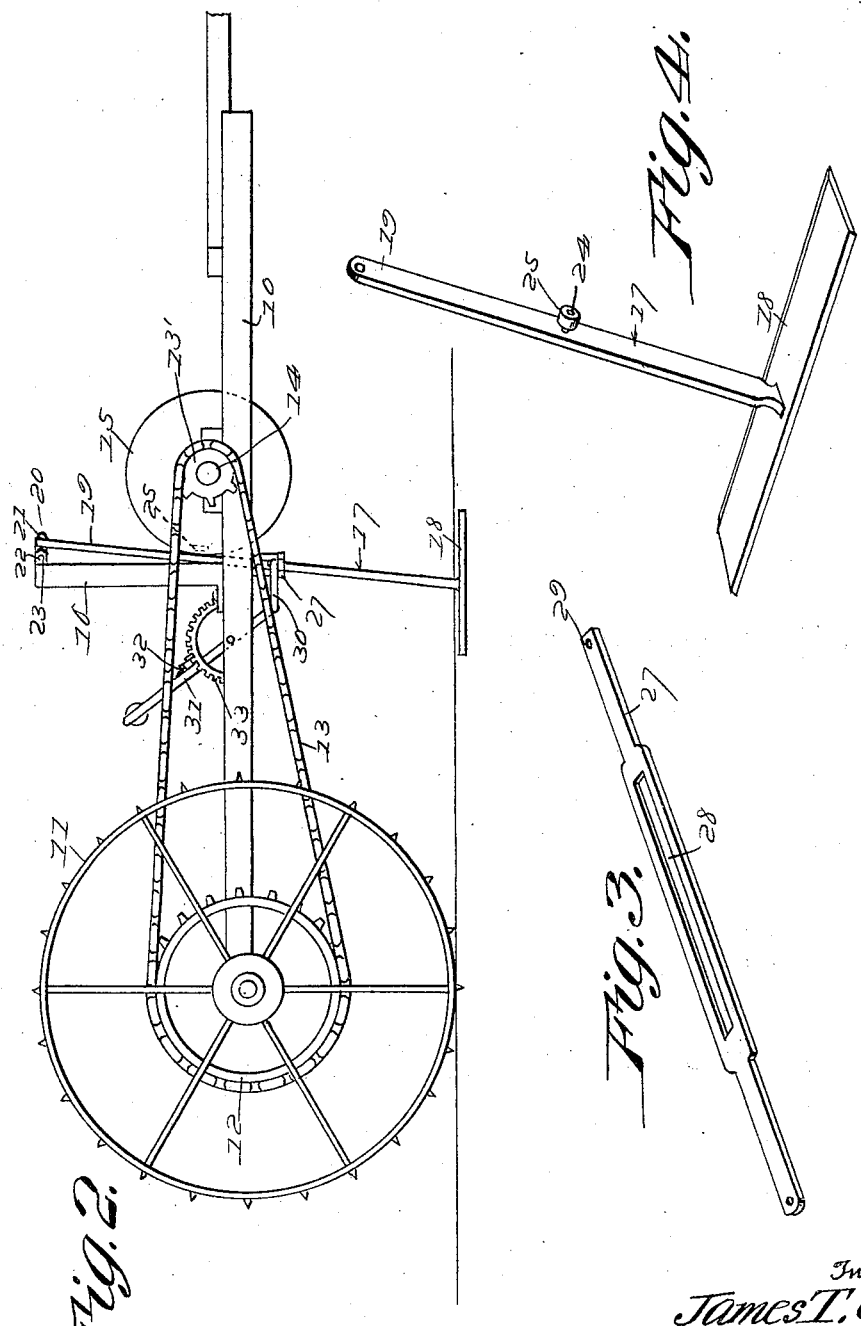

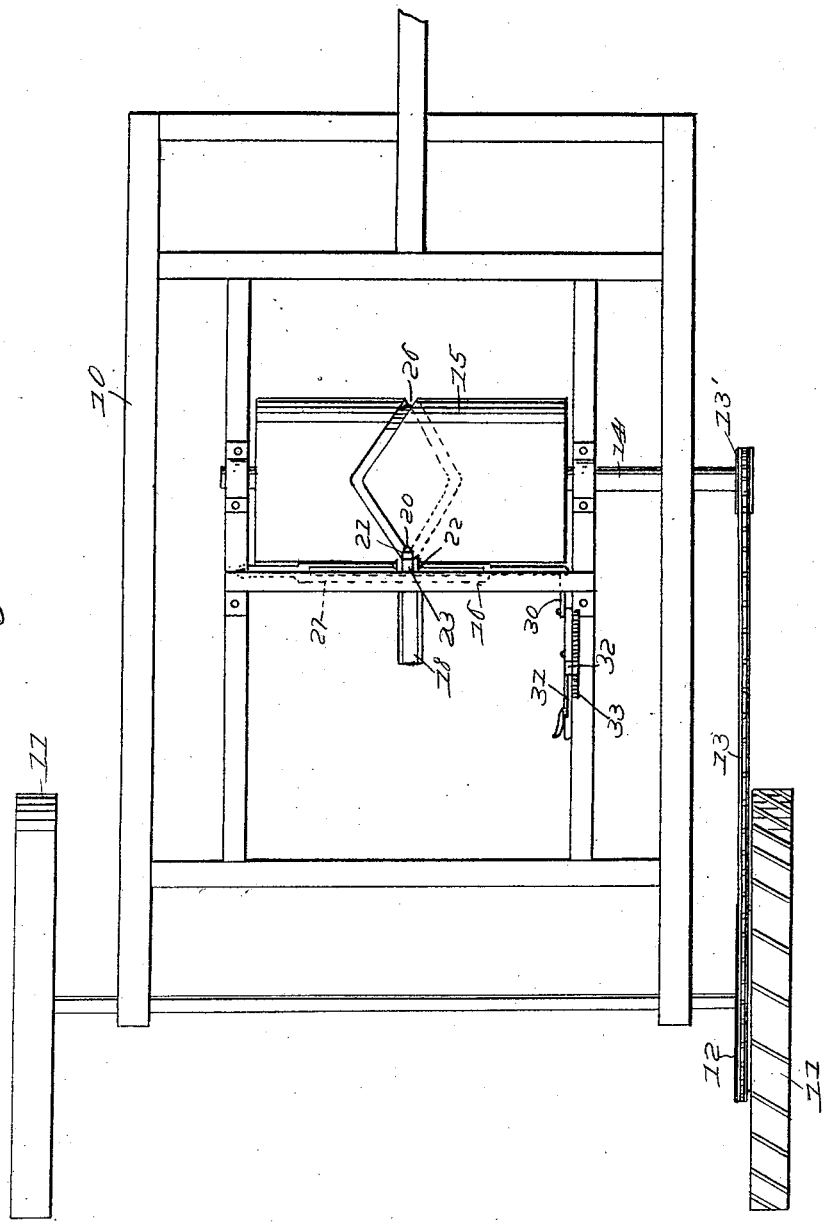

UNITED STATES PATENT OFFICE.

JAMES T. ODELL, OF BIRMINGHAM, ALABAMA.

COTTON CHOPPER.

1,418,159. Specification of Letters Patent. Patented May 30, 1922.

Application filed August 22, 1919. Serial No. 319,268.

*To all whom it may concern:*

Be it known that JAMES T. ODELL, a citizen of the United States of America, residing at Birmingham, in the county of Jefferson and State of Alabama, has invented new and useful Improvements in Cotton Choppers, of which the following is a specification.

The object of the invention is to provide a simple and efficient cotton chopper adapted to be operated parallel with a row of plants for cutting out blocks of the row at predetermined intervals to leave properly spaced stands of cotton, the means for operating the hoe or cutting tool being such as to permit driving by a simple connection from an ordinary traction or ground wheel and the parts being so related as to minimize the risk of disarrangement and facilitate repair in the event of strain or injury.

With these and similar objects in view the invention consists in a construction and combination of parts of which a preferred embodiment is illustrated in the accompanying drawing wherein:

Figure 1 is a plan view.

Figure 2 is a side view.

Figure 3 is a detail view of the guide for the hoe stem.

Figure 4 is a detail view of the hoe.

The supporting and draught means necessary in connection with the apparatus representing an embodiment of the invention may consist of a frame 10 having traction or ground wheels 11 arranged to operate a sprocket wheel 12 from which extends a chain 13 to a second and preferably reduced sprocket 13' on the shaft 14 of a drum 15. Supported by the frame adjacent to the plane of the drum is a bracket 16 which forms a support for a laterally oscillatory hoe 17 of which the blade 18 is adapted to move transversely with relation to a row of cotton straddled by the machine, the stem 19 of said hoe having a universal swinging connection with the bracket as indicated at 20. This universal connection may consist of a link 21 to which the stem 19 is pivoted and which in turn is pivoted as at 22 to an ear 23 of the bracket 16.

At an intermediate point the stem of the hoe is provided with a guide pin 24 preferably having an anti-friction roller or sleeve 25 mounted thereon for engagement with a cam groove 26 in the drum, so that the rotation of the drum actuated through the chain 13 from the ground wheel will cause a transverse or laterally oscillatory movement of the hoe to cut out the superfluous cotton plants, and mounted upon the main frame and preferably near the plane thereof is a guide bar 27 having a slot 28 through which the stem of the hoe extends and in which the same swings as a means of stiffening the structure and insuring the oscillatory movement of the hoe stem in a plane which insures the engagement of the guide pin 24 with the cam groove 26. This guide bar may be pivoted as at 29 near one end to the supporting frame while to the other end thereof through a link 30 is connected a hand lever 31 which enables the operator to move the hoe stem to either engage or disengage the guide pin 24 and the cam groove in the drum. A pawl 32 and rack 33 in connection with the hand lever serve to maintain the latter in its adjusted positions.

From the above description it will be seen that the motion communicated from the ground wheel to the drum is converted directly into an oscillatory movement of the hoe stem, so as to afford the maximum efficiency of the hoe or cutter with the least possible strain upon the machine and with the minimum loss due to transmission, and at the same time the simplicity in the arrangement of the parts serves to reduce the risk of disarrangement in operation or due to strain and the opportunity for repair in the event of any necessity for the same is facilitated.

What is claimed is:

1. A cotton chopper having a rotary drum provided with a cam groove, a hoe having its stem universally mounted and provided at an intermediate point with a guide pin carrying a roller engaging with the groove of said drum, and movable means for guiding said stem in a path parallel with the axis of the drum.

2. A cotton chopper having a rotary drum provided with a cam groove, a hoe having a universally mounted stem provided at an intermediate point with a guide pin carrying a roller engaging said groove, a guiding member having a slot for said hoe stem to maintain the latter in a path parallel with the axis of the drum, and means for shifting said guide member to dispose the said guide pin roller in operative and inoperative relations with the said groove.

3. A cotton chopper having a rotary drum provided with a cam groove, a hoe having a universally mounted stem provided at an intermediate point with a guide pin carrying a roller engaging said groove, a pivotal guide bar having a slot for the hoe stem and adapted for arrangement to guide the latter in a path parallel with the axis of the drum, and means connected with the guide bar for moving the latter to remove said guide pin roller from engaging relation with the groove.

In testimony whereof he affixes his signature.

JAMES T. ODELL.